United States Patent [19]
Webley

[11] 3,939,596
[45] Feb. 24, 1976

[54] ANIMAL TRAP

[76] Inventor: Lawrence E. Webley, P.O. Box 91, Wilson Creek, Wash. 98860

[22] Filed: Jan. 3, 1975

[21] Appl. No.: 538,352

[52] U.S. Cl. .......................................... 43/90; 43/93
[51] Int. Cl.² ......................................... A01M 23/26
[58] Field of Search ............................ 43/88, 90, 93

[56] References Cited
UNITED STATES PATENTS

| | | | |
|---|---|---|---|
| 1,337,149 | 4/1920 | Nelson et al. | 43/88 |
| 1,445,203 | 2/1923 | Dewey | 43/93 |
| 1,582,797 | 4/1926 | Stanford | 43/90 |
| 1,825,193 | 9/1931 | Maddox | 43/90 |
| 2,202,408 | 5/1940 | Torgerson | 43/93 |

Primary Examiner—Warner H. Camp
Attorney, Agent, or Firm—Wells, St. John & Roberts

[57] ABSTRACT

An animal trap, using two jaws that are generally U-shaped and pivoted to the upturned ends of a base plate is characterized by having the animal engaging base portions of the jaws generally circular in cross section and the leg portions flattened to provide wedge members that hold the circular base portions spaced apart when the trap is closed, spring means for closing the jaws comprises two like leaf springs. Each leaf spring is of V-shape and has a lower circular end hole to receive the upturned end of the base plate, and a second circular end hole for sliding over the leg portions as the spring spreads. The spring leaf is cupped around the second circular end hole and widened substantially in the general longitudinal direction of the spring to provide a cam that can be placed directly under the jaw legs when the spring is turned crosswise with respect to the base plate to provide increased leverage on the jaws at the initial lift thereof from open position. The base plate carries a movable trigger support for the trap pan, operable to hold the pan raised and the jaws open.

3 Claims, 12 Drawing Figures

U.S. Patent Feb. 24, 1976 3,939,596
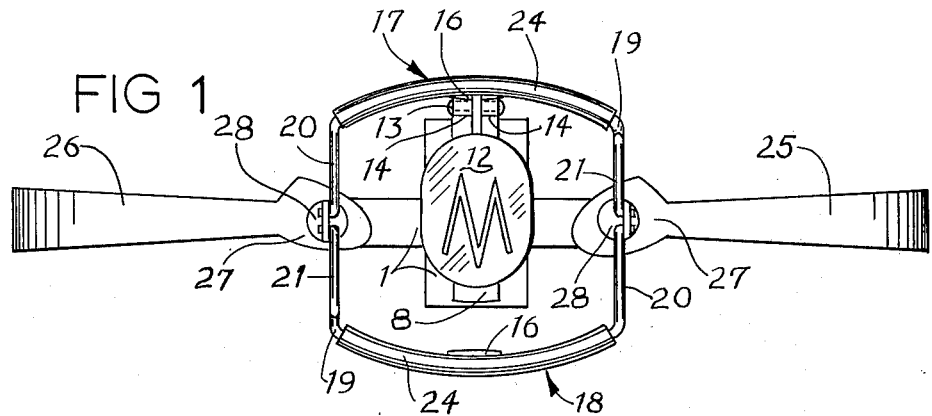
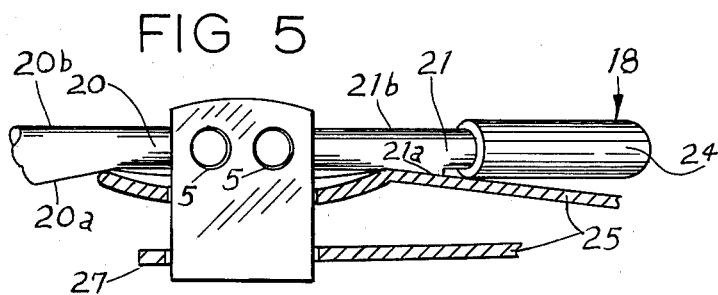
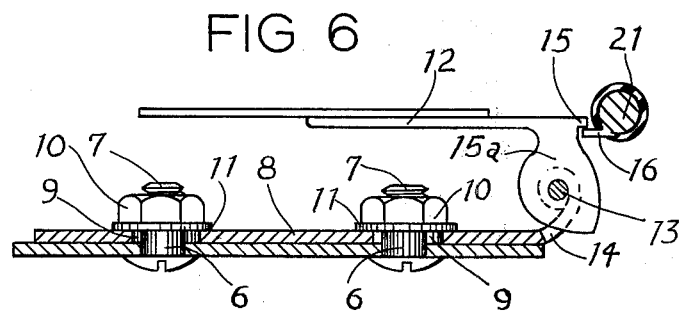
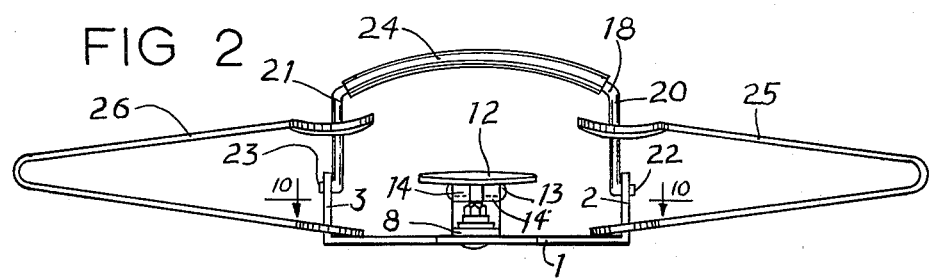

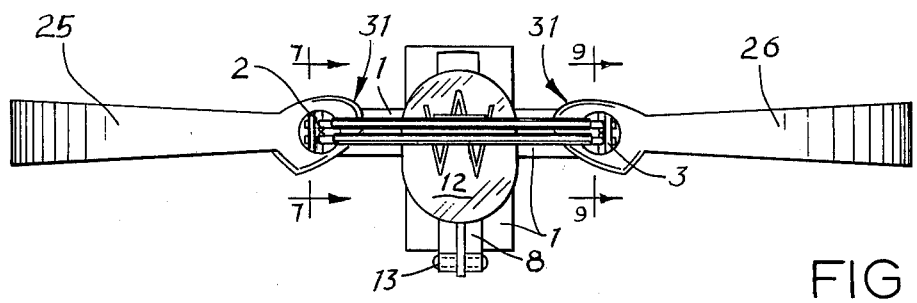
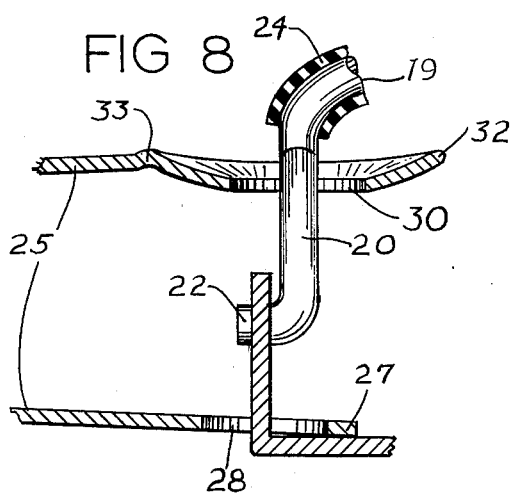
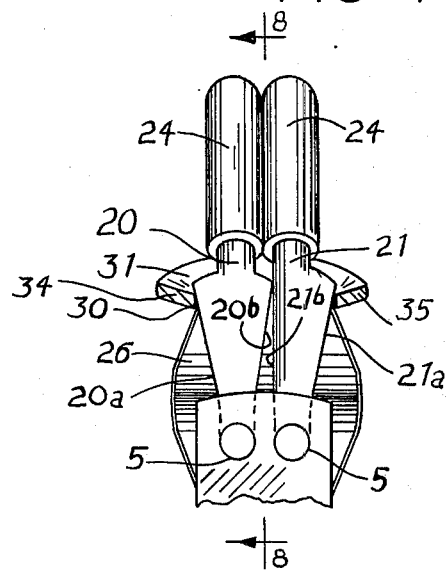
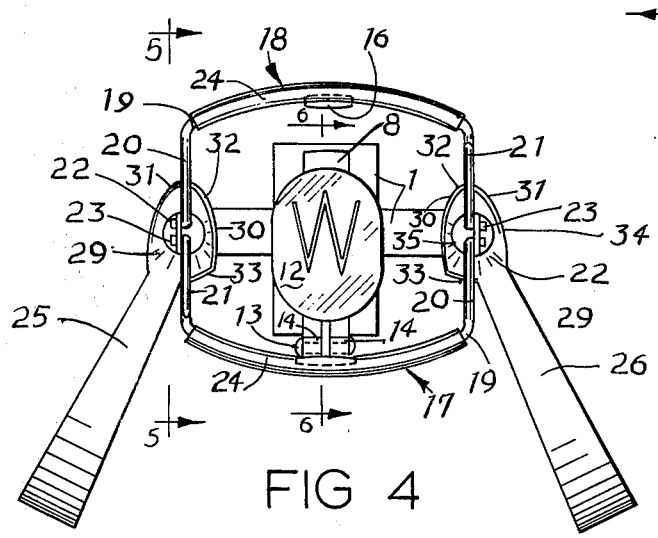

U.S. Patent Feb. 24, 1976 Sheet 3 of 3 3,939,596
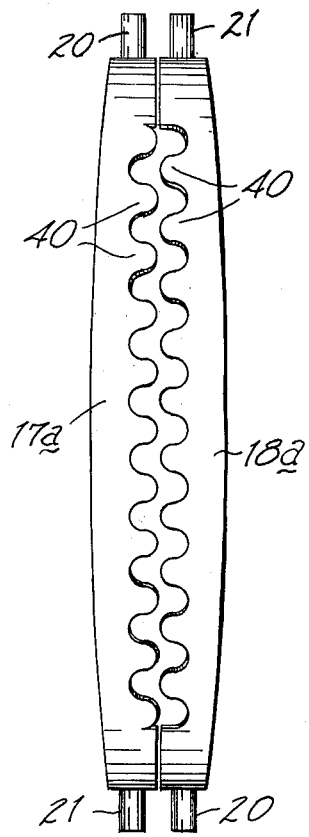
FIG 11
FIG 9
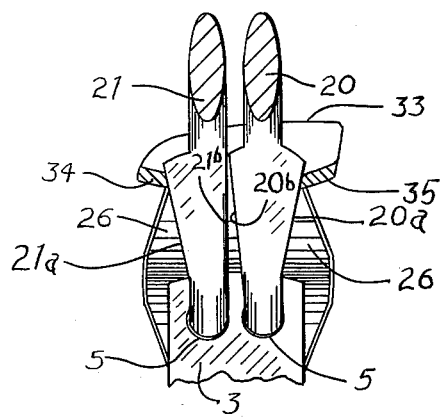
FIG 10
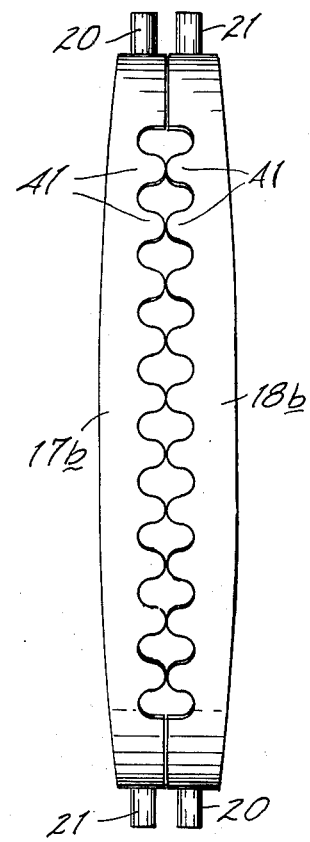
FIG 12
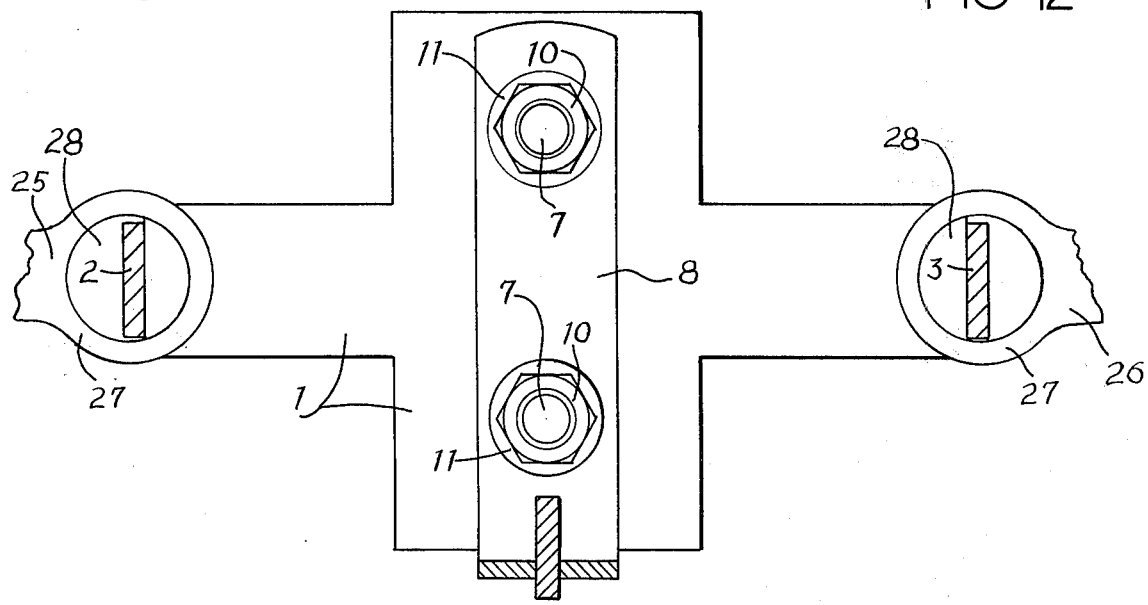

ANIMAL TRAP

BACKGROUND OF THE INVENTION

The spring pressed jaw animal traps have been in use since before 1900 and over the years have remained generally the same. They embody a pair of generally U-shaped jaws of strong construction with the leg portions of the jaws having tip portions turned outwardly endwise in the jaw planes to provide pintles that are seated in spaced apart holes in upturned end portions of a base plate that also supports the pan and the latch by which one of the jaws is held open.

A novelty search of the prior patents disclosed U.S. Pat. No. 716,255 to Leonard using the structure just described wherein the jaws are closed by a single leaf spring of V-shape. Also in U.S. Pat. No. 1,337,149 to Nelson and Boode, a similar trap is shown embodying two V-shaped springs for lifting the jaws. These springs have holes in both ends and the metal around the holes is cupped so that greater leverage may be had at the beginning of the lift of the jaws by the springs. Another kind of jaw lifting spring is provided with a flaring shape 10 around the jaw opening 11 in the U.S. Pat. No. 1,430,242 to Mullen.

The U.S. Pat. No. 2,333,828 uses coiled spring means to lift the jaws and the jaw engaging tubes 47 are flat topped to support the jaws in open position.

In all of these spring closed leg catching jaw traps, it has been a problem to so construct the trap as to securely hold the leg of the animal and not break or cut off the leg. Padding of the jaws with resilient leg engaging pads is disclosed in the U.S. Patent to Briddell, No. 2,146,464, also in the Maddox U.S. Pat. No. 1,825,193 and the O'Neil U.S. Pat. No. 2,316,970. In these patents as in all of the patents discussed herein, the leg engaging faces of the jaws are flat with corners at both edges of the flat face. Such a jaw face is apt to lead to chewing by the animal at these corners. If the face is a rubber or other yielding material, the material and the leg is chewed off at the corner and a crippled animal is returned to the wild.

PURPOSE OF THE INVENTION

The applicant traps predator animals such as coyotes to keep them from destroying such domestic animals as lambs, pigs, calves and colts. These predators also need to be kept in check to avoid the losses they cause among wild birds. The basic purpose of this invention is to improve the ability of the trap to catch a leg of the animal and hold it securely with the minimum damage to the leg.

Specifically, it is a purpose of the invention to provide, in combination, improved round cushion jaw portions for contacting the leg of the animal and leaf spring-jaw cam elements cooperating through angular adjustment of the spring to vary the initial lift capacity of the spring on the jaw while keeping the space within the jaw area of maximum size to receive the animal foot.

Another more specific object of the invention is to improve the pan-trigger-jaw mount on the trap base plate to keep the trigger and base plate within the area surrounded by the jaws when opened and to prevent the trigger from lifting the animal foot when the trigger is released.

Another object of the invention is to provide means for limiting the closing of the jaws together a limited amount so as to prevent the cutting of the leg tendons of the animal.

BRIEF DESCRIPTION OF THE DRAWINGS

FIG. 1 is a plan view of my trap in open position with the spring jaws thereof aligned endwise as they are when setting the trap;

FIG. 2 is a side view of the trap with the jaws in tripped position;

FIG. 3 is a top view of the trap, as it appears before setting, with the springs aligned endwise for being compressed;

FIG. 4 is a plan view of the trap in set position with the spring jaws turned crosswise into nearly parallelism with each other to bring the lift cams thereon into position to exert maximum lift on the jaws;

FIG. 5 is an enlarged sectional view on the line 5—5 of FIG. 4;

FIG. 6 is an enlarged fragmentary sectional view on the line 6—6 of FIG. 4;

FIG. 7 is an enlarged fragmentary sectional view taken substantially on the line 7—7 of FIG. 3;

FIG. 8 is a sectional view on the line 8—8 of FIG. 7;

FIG. 9 is an enlarged sectional view on the line 9—9 of FIG. 3;

FIG. 10 is an enlarged sectional view on the line 10—10 of FIG. 2.

FIG. 11 is an enlarged top view of a modified set of jaws;

FIG. 12 is an enlarged top view of another modified set of jaws.

GENERAL DESCRIPTION

The invention as shown in the drawings includes a base plate 1 which may be of any suitable metal, usually of steel. This plate 1 is shown with two narrow upturned ends 2 and 3 and with a widened central portion 4. The end portions 2 and 3 are apertured with two pintle apertures 5 in each end. The base plate 1 also has two apertures 6 in the central portion to receive bolts 7 (see FIG. 6) that mount a pan carrying mount 8. The mount 8 is a bar slotted at 9 for the bolts 7. Nuts 10 and washers 11 are used to clamp the mount 8 in the desired adjusted position on the base plate 1. The adjustment offered by the foregoing parts is needed to position a pan 12 that has its pivot pin 13 journalled in two upturned tips 14 on one end of the bar 8. The pan 12 has a triggered portion 15 which engages a rib 16 on one of the jaws 17 and 18 of the trap. The pivot pin 13 is centered in an extension 15a of the trigger portion 15 and preferably rotatably mounted in the portion 15a and fixed in the tips 14. The extension 15a and lips 14 keep the jaw from rocking sidewise.

The jaws 17 and 18 are alike. Each jaw has a base portion 19 which is circular in cross section and is bowed slightly. At the ends of the base portion 19 are leg portions 20 and 21 having out turned pintles 22 and 23 to seat in the apertures 5 in the upturned ends 2 and 3 of the base plate 1. The base portion 19 of each jaw has a covering 24 thereon. This covering is resilient and preferably is made of a tough natural or a synthetic rubber such as neoprene and bonded to the jaw metal. The spacing of the pintle apertures 5 is such that when the jaws are pressed together the coverings 24 on the base portions are in contact. Each jaw 17 or 18 has one of its leg portions 20 flattened to provide upwardly diverging edges 20a and 20b. The other leg portion 21 of that jaw is flattened so as to provide an edge 21a diverging upwardly out of the plane of the jaw. The opposite edge 21b is parallel to the plane of the jaw.

In putting the jaws 17 and 18 on the base plate 1, they are so arranged that the leg portion 20 of the jaw 17 is alongside the leg portion 21 of the jaw 18 and the leg portion 21 of the jaw 17 is alongside the leg portion 20 of the jaw 18 with the edges 21b abutting the edges 20b to space the jaws slightly when the pintles are in the pintle apertures and the jaws are parallel. This is illustrated in FIGS. 7 and 9 of the drawings. This arrangement is of advantage in preventing the jaws from cutting the tendons in the animals leg by the metal of the jaws. The spacing of the base portions 19 of the jaws from each other preferably is such that the coverings 24 engage each other when the jaws are closed with no animal leg or foot between them.

The spring means for pressing the jaws toward each other and holding the animal's leg therebetween comprises two V-shaped leaf springs 25 and 26. Each leaf spring has one end 27 provided with an aperture 28 which receives one of the upturned ends 2 or 3 of the base plate 1. The other end 29 of each spring has an aperture 30 therein which is above the aperture 28 and moves upwardly around the leg portions 20 and 21 to urge the jaws 17 and 18 toward each other when the trigger portion 15 releases the rib 16 on the jaw that is held down.

The end 29 of the spring comprises a cam portion 31 around the aperture 30 that is shaped as indicated best in FIGS. 3, 4, 7 and 8 to have extended raised rounded tips 32 and 33 directly opposite each other and much narrower sides 34 and 35 which complete the encirclement of the aperture 30.

In setting a trap of this character it is customary for the trapper to extend the springs 25 and 26 endwise in line as shown in FIG. 3 of the drawings. By placing the base plate 1 on his leg just above the knee the trapper can press down on the springs 25 and 26 to force the ends 27 and 29 both onto the ends 2 and 3 of the base plate 1 and thus free the jaw portions 20 and 21 from the springs and allow the jaws to fall into the open position illustrated in FIGS. 1, 4 and 5. Then he can use a finger to raise the pan 12 until the trigger portion 15 overlies the rib 16 on the adjacent jaw 17. He can then let the upper end 29 of one spring rise until its side 34 lifts the jaw 17 against the trigger portion 15 and thus holds the pan 12 in raised or "set" position. It is customary then to swing the springs 25 and 26 from their position shown in FIG. 1 to their position shown in FIG. 4 to give greater stability to the trap and to reduce the area which needs to be camouflaged. In this FIG. 4 position the cam tips 32 and 33 are placed directly under the leg portions 20 and 21 and provide the greatest leverage for the spring force to lift the legs.

The relation just described between the spring cam portions 31 and the jaws 17 and 18 provides this trap with a strong leverage on the jaws at the beginning of the lift action of the springs. As shown in FIG. 4 the tips 32 and 33 extend out almost halfway from the pivots of the jaws in the upturned ends to the points where the leg portions join the base portions of the jaws. Also, since the sides 34 and 35 can be quite narrow as shown in FIGS. 4 and 7, they do not block the area between the pan 12 and the upturned ends 2 and 3 of the base plate 1 as would be the case if the cam portions 31 were circular. The maximum spring pressure on the jaws at the open position of the jaws speeds the jaws quickly upward to catch the animal's leg before he can withdraw it. I have found fewer "toe" catches with this trap than with the present commercially available traps.

The pan and trigger arrangement illustrated best in FIGS. 6 and 10 cooperates with the quick opening jaws to further insure fewer toe catches. There is no swinging trigger lever such as is found on the commercially available traps and shown in such patents as Leonard 716,255, Sloan 1,056,714, Colbertson 2,201,307, Maddox 1,825,193, McMullen 1,430,242, Nelson et al. 1,337,149, Briddell 2,146,464, Rupp 794,684 and Taylor 2,333,828. The closest prior device to applicant's means of latching the jaw down that applicant is aware of is found in O'Neal U.S. Pat. No. 2,316,970, but his device appears to raise the pan 34 to an undesirable height in order to secure the jaw. Applicant's trap provides the means (bar 8 mounted for endwise movement on the base plate, 1 and the rib 16) to set the pan at the level of the open jaws.

FIGS. 11 and 12 show modified jaws designed to minimize damage to the trapped animals without a covering material as described above. The jaws 17a and 18a in FIG. 11 have intermeshing rounded teeth 40 staggered along their lengths. They remain spaced apart a minimum distance due to the abutting edges 20b and 21b as described above. Opposed teeth 41 on jaws 17b and 18b in FIG. 12 form a series of enclosed pockets which can receive the leg bones of an animal without severing the leg or adjacent tendons.

The invention for which exclusive right is requested by this application is defined as follows.

I claim:

1. In an animal trap of the type having two U-shaped jaws with downturned legs and having a base plate with two upturned ends with apertures therein for mounting lower ends of the downturned legs for pivotal movement about parallel horizontal axes between horizontal coplanar open set positions and vertical abutting closed positions, an improvement comprising:

a pan mount secured to the base plate:
a pan pivotably mounted to the pan mount about an axis parallel to the axes of said jaws;
a protruding rib on one of the jaws, said rib extending inwardly toward the remaining jaw when the jaws are in their open positions;
trigger notch means formed on the pan protruding outward toward said one jaw for engagement with the rib when the jaws are in an open set condition with said one jaw located alongside said pan for holding the jaws in their open positions until a downward force is applied against the pan;
spring means for urging the jaws toward a closed condition comprising a V-shaped leaf spring having top and bottom leaves with holes at opposite spring ends to receive one upturned end of the base plate and the jaw legs pivoted thereto;
wherein the upper leaf includes an oblong upturned cam surface surrounding the hole that receives the jaw legs, the cam surface being longitudinally oriented parallel to the length of the leaf spring with opposed raised cam tips spaced longitudinally and equidistant from the hole; and
lower cam sides joining the cam tips having longitudinal edges spaced transversely apart relative to the length of the leaf spring by a distance less than the distance between the cam tips, whereby the cam tips are positioned under the jaw legs with the lower cam sides projecting toward the pan when the leaf spring is oriented transverse to the pivot axes of the jaws.

2. The invention defined in claim 1 wherein the pan mount comprises a bar with a trigger and pan support provided at one end of the bar; and releasable means adjustably mounting the bar to the base plate for adjusting the point of engagement between the rib and the trigger notch by varying the location of the pan mount with respect to the base plate in a direction transverse to the pivot axes of the jaws.

3. The invention defined in claim 1 wherein the base portions of the U-shaped jaws are circular in cross section;

the legs of said jaws provide wedge members holding the circular base portions from contact with each other when the jaws are forced together by said spring means;

the jaws being alike in shape and reversed end for end to face the wedge members toward each other.

* * * * *